(12) United States Patent
Sato et al.

(10) Patent No.: US 10,829,094 B2
(45) Date of Patent: Nov. 10, 2020

(54) WASHER FLUID HEATING DEVICE

(71) Applicant: MURAKAMI CORPORATION, Shizuoka (JP)

(72) Inventors: Hidenori Sato, Shizuoka (JP); Futoshi Suzuki, Shizuoka (JP); Masayuki Sugiyama, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 164 days.

(21) Appl. No.: 16/083,692

(22) PCT Filed: Mar. 1, 2017

(86) PCT No.: PCT/JP2017/008170
§ 371 (c)(1),
(2) Date: Sep. 10, 2018

(87) PCT Pub. No.: WO2017/159373
PCT Pub. Date: Sep. 21, 2017

(65) Prior Publication Data
US 2019/0084529 A1 Mar. 21, 2019

(30) Foreign Application Priority Data

Mar. 18, 2016 (JP) ................. 2016-054915

(51) Int. Cl.
*B60S 1/48* (2006.01)
*B60S 1/50* (2006.01)
*B60S 1/52* (2006.01)

(52) U.S. Cl.
CPC ............... *B60S 1/488* (2013.01); *B60S 1/48* (2013.01); *B60S 1/50* (2013.01); *B60S 1/52* (2013.01)

(58) Field of Classification Search
None
See application file for complete search history.

(56) References Cited

U.S. PATENT DOCUMENTS 1,873,820 A * 8/1932 Carpenter ............... F24H 1/121
392/493
2,544,927 A * 3/1951 Knapp ................... F24H 1/185
392/458

(Continued)

FOREIGN PATENT DOCUMENTS

JP 46-12422 4/1971
JP 53-55592 10/1978

(Continued)

OTHER PUBLICATIONS

Official Communication issued in International Bureau of WIPO Patent Application No. PCT/JP2017/008170, dated May 30, 2017.

(Continued)

*Primary Examiner* — Thor S Campbell
(74) *Attorney, Agent, or Firm* — Greenblum & Bernstein, P.L.C.

(57) ABSTRACT

A washer fluid heating device according to an embodiment includes: a container which stores a washer fluid; a deflector which vertically partitions a storage space for the washer fluid into an upper space and a lower space; an inflow portion through which the washer fluid flows into a lower side of the storage space partitioned by the deflector; an outflow portion which is provided to an upper side of the storage space partitioned by the deflector to cause the washer fluid to flow out of the container; and a heating portion which is positioned in the storage space, in which, in the deflector, a plurality of holes which cause the washer fluid to pass from the lower side toward the upper side of the storage space are disposed to be substantially evenly distributed.

20 Claims, 6 Drawing Sheets

(56) References Cited

U.S. PATENT DOCUMENTS

| | | | | |
|---|---|---|---|---|
| 2,644,432 | A * | 7/1953 | Hummel | D06F 39/00 122/14.1 |
| 3,418,973 | A * | 12/1968 | Saito | A01K 63/003 119/226 |
| 3,962,560 | A * | 6/1976 | Braathen | F24H 1/202 392/456 |
| 4,514,617 | A * | 4/1985 | Amit | F24H 1/20 122/18.4 |
| 4,598,694 | A * | 7/1986 | Cromer | F24D 17/0021 122/19.1 |
| 4,637,347 | A * | 1/1987 | Troy | F24D 3/082 122/15.1 |
| 5,092,279 | A * | 3/1992 | Barmore | F24H 1/202 122/19.1 |
| 5,118,040 | A | 6/1992 | Abe | |
| 5,179,914 | A * | 1/1993 | Moore, Jr. | F24H 1/182 122/18.3 |
| 5,957,384 | A * | 9/1999 | Lansinger | B60S 1/481 219/202 |
| 6,321,036 | B1 * | 11/2001 | Huang | F24H 1/202 392/441 |
| 7,644,686 | B2 * | 1/2010 | Threatt | F24H 1/18 122/33 |
| 7,657,961 | B2 * | 2/2010 | Shank | B05B 9/002 15/250.01 |
| 10,017,162 | B2 * | 7/2018 | Sato | B60S 1/487 |
| 10,442,406 | B2 * | 10/2019 | Sato | F24H 1/009 |
| 2004/0234255 | A1 * | 11/2004 | Yui | A47J 27/21166 392/450 |
| 2012/0183281 | A1 * | 7/2012 | Sato | F24H 1/009 392/441 |

FOREIGN PATENT DOCUMENTS

| | | |
|---|---|---|
| JP | 60-26245 | 2/1985 |
| JP | 63-306953 | 12/1988 |
| JP | 4-11175 | 1/1992 |
| JP | 8-5146 | 1/1996 |
| JP | 2006-207993 | 8/2006 |
| JP | 2007-240117 | 9/2007 |
| JP | 2012-144194 | 8/2012 |
| WO | 2007/010538 | 1/2007 |

OTHER PUBLICATIONS

Official Communication issued in International Bureau of WIPO Patent Application No. PCT/JP2017/008170, dated Sep. 27, 2018.

* cited by examiner

WASHER FLUID HEATING DEVICE

TECHNICAL FIELD

The present disclosure relates to a washer fluid heating device.

BACKGROUND ART

Hitherto, a washer fluid which is sprayed onto a front glass for the purpose of dissolving frost adhered to the front glass of a vehicle is known. In a vehicle or the like, a heating device for heating the washer fluid is mounted. In Japanese Unexamined Patent Publication No. 2012-144194, a washer fluid heating device having a cylindrical shape with a bottom is described. The heating device includes a heat retaining hot water storage chamber which stores a washer fluid, and a small heating chamber provided inside the heat retaining hot water storage chamber. An electric heater is provided in the internal space of the small heating chamber. A disk-shaped movable diaphragm lid is accommodated inside the small heating chamber, and a circular center hole is formed in the movable diaphragm lid.

In Japanese Unexamined Utility Model Publication No. H4-11175, a vehicle window glass cleaning device including a tank which stores a cleaning solution, an intermediate tank connected to the tank via a liquid feed pipe line, and a spray nozzle through which the cleaning solution stored in the intermediate tank is sprayed onto a window glass of a vehicle is described. In the vehicle window glass cleaning device, an electric heater is assembled into the intermediate tank, and the electric heater heats the cleaning solution. In addition, inside the intermediate tank, three perforated baffles are vertically arranged above the electric heater. The perforated baffles are provided to prevent an abrupt convection that occurs in the intermediate tank.

CITATION LIST

Patent Literature

Patent Literature 1: Japanese Unexamined Patent Publication No. 2012-144194
Patent Literature 2: Japanese Unexamined Utility Model Publication No. H4-11175

SUMMARY OF INVENTION

Technical Problem

In the washer fluid heating device described above, since the perforated baffles are provided in a container that stores the washer fluid, a rapid rise of the washer fluid heated by the electric heater is suppressed, and it is possible to suppress convection above the perforated baffles. However, in the vehicle window glass cleaning device published as described above, since the three perforated baffles are vertically arranged, there is a problem that the pressure loss of the washer fluid is high. In a case where the pressure loss of the washer fluid is high, the pressure of the washer fluid flowing out of the container decreases, so that a problem that the position of the washer fluid sprayed through the spray nozzle is lowered may be incurred.

Furthermore, regarding the perforated baffles described above, in a case where the position of a hole of the perforated baffle is biased, the flow of the washer fluid passing through the hole is also biased, and the washer fluid is likely to be stirred above the perforated baffle. When stirring occurs above the perforated baffle, the heated washer fluid is stirred, and not only a sufficiently heated washer fluid can be caused to flow out of the container. Therefore, a problem that the temperature of the washer fluid flowing out of the container decreases may be incurred.

The present disclosure describes a washer fluid heating device capable of suppressing a pressure loss of a washer fluid and suppressing a decrease in temperature of the washer fluid flowing out of a container.

Solution to Problem

A washer fluid heating device according to an embodiment of the present disclosure includes: a container which stores a washer fluid; a partition member which vertically partitions a storage space for the washer fluid into an upper space and a lower space; an inflow portion through which the washer fluid flows into a lower side of the storage space partitioned by the partition member, an outflow portion which is provided to an upper side of the storage space partitioned by the partition member to cause the washer fluid to flow out of the container, and a heating portion which is positioned in the storage space, in which, in the partition member, a plurality of holes which cause the washer fluid to pass from the lower side toward the upper side of the storage space are disposed to be substantially evenly distributed.

The washer fluid heating device includes the partition member which vertically partitions the storage space for the washer fluid in the container, and the inflow portion through which the washer fluid flows into a lower side of the storage space partitioned by the partition member. Therefore, the washer fluid that has flowed into the storage space hits the partition member from below. An abrupt rise of the washer fluid can be suppressed by the partition member and it is possible to cause the washer fluid to slowly rise. In addition, in the partition member, the plurality of holes through which the washer fluid passes from the lower side toward the upper side are disposed to be substantially evenly distributed. Therefore, the washer fluid rises from each of the plurality of holes disposed to be substantially evenly distributed. Therefore, the washer fluid can be caused to smoothly rise, and the pressure loss of the washer fluid can be reduced. In addition, since the washer fluid slowly rises from the partition member substantially evenly, it is possible to cause agitation to be less likely to occur above the partition member. Furthermore, the outflow portion through which the washer fluid flows out is provided above the partition member. Therefore, the washer fluid that has been sufficiently heated can be caused to flow out of the outflow portion, so that a decrease in the temperature of the washer fluid flowing out of the container can be suppressed. Furthermore, since the part of the upper side and the part of the lower side of the storage space are partitioned by the partition member, it is possible to cause heat to be less likely to escape into the part of the lower side. Therefore, the decrease in the temperature of the washer fluid flowing out of the outflow portion can be further reliably suppressed.

In addition, a total cross-sectional area of flow passages of the washer fluid in the plurality of holes may be larger than a cross-sectional area of a flow passage of the washer fluid in the inflow portion. In this case, the washer fluid rises more smoothly from the plurality of holes, so that the pressure loss of the washer fluid can be more reliably reduced.

In addition, the partition member may have a plurality of first protrusions protruding downward. In this case, the plurality of first protrusions protrude downward from the partition member. Therefore, the washer fluid that has flowed in flows into the plurality of first protrusions from below, so that the washer fluid below the partition member can be agitated. Therefore, an abrupt rise of the washer fluid from the partition member can be more reliably suppressed, and the rise of the washer fluid from the partition member can be made more uniform.

In addition, the partition member may have a second protrusion protruding downward at a position facing the inflow portion. In this case, the washer fluid that has flowed into the container flows into the second protrusion, so that the flow of the washer fluid can be dispersed by the second protrusion. Therefore, an abrupt rise of the washer fluid from the partition member can be more reliably suppressed, and the washer fluid can be caused to uniformly and slowly rise from the partition member. Furthermore, since the washer fluid that has flowed in is dispersed, the inflow pressure of the washer fluid against the partition member can be reduced. Therefore, vibration of the partition member due to the inflow of the washer fluid can be more reliably suppressed.

In addition, the partition member may be formed of a material having flexibility. In this case, the partition member can be easily bent, so that it is possible to easily dispose the partition member in the container.

In addition, the partition member may have a slit extending inward from an outer edge of the partition member. In this case, the partition member can be more easily bent, and it is possible to more easily dispose the partition member in the container.

Advantageous Effects of Invention

According to the present disclosure, it is possible to suppress the pressure loss of the washer fluid and suppress the decrease in the temperature of the washer fluid flowing out of the container.

DESCRIPTION OF EMBODIMENTS

Hereinafter, an embodiment of a washer fluid heating device according to the present disclosure will be described with reference to the drawings. In the description of the drawings, the same reference numbers are assigned to the same components or to similar components, and overlapping descriptions will be omitted.

First Embodiment

Figure 1:
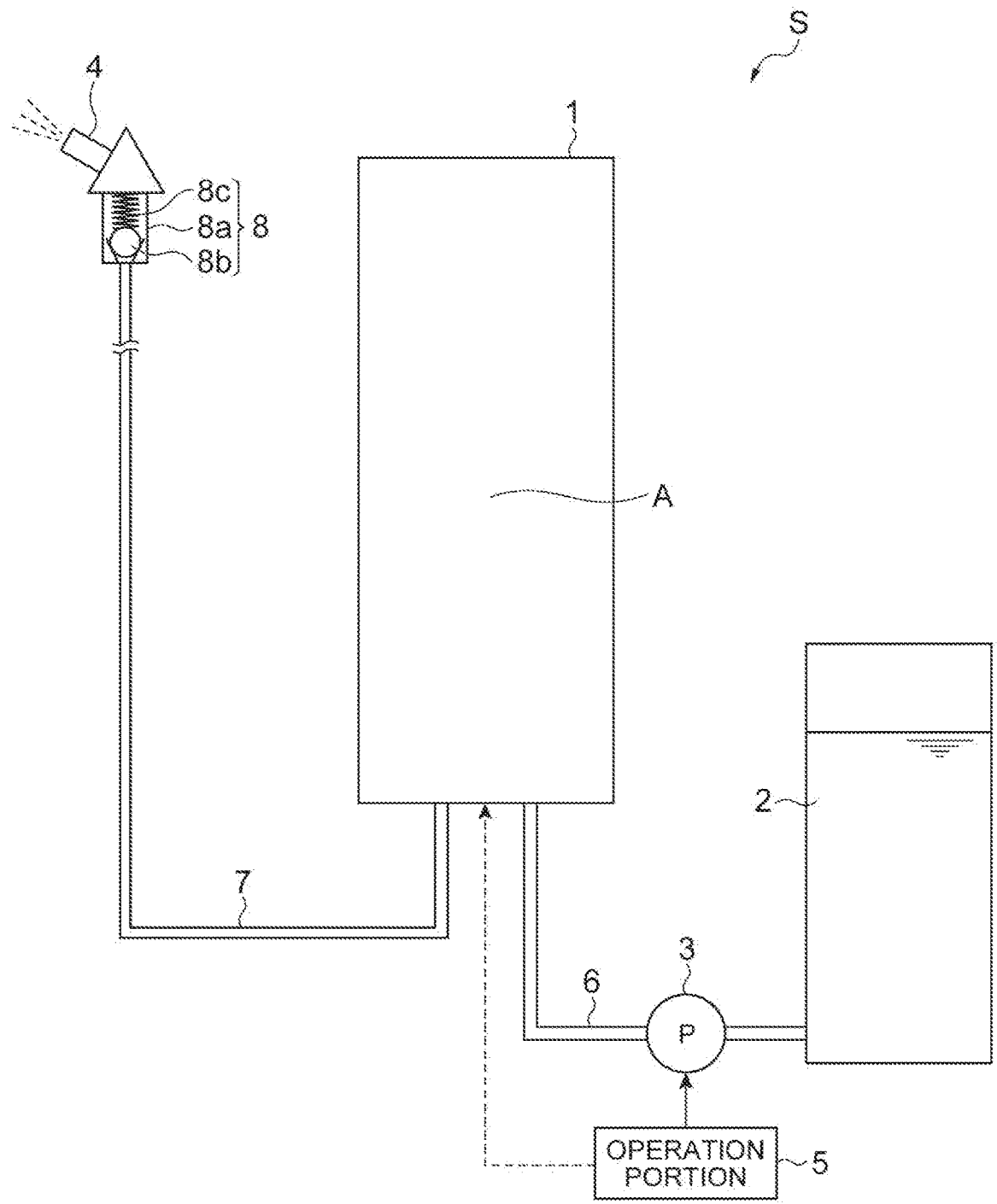
FIG. 1 is a view schematically illustrating a washer fluid supply system provided with a washer fluid heating device according to a first embodiment.

Hereinafter, an example in which a washer fluid heating device 1 according to this embodiment is applied to a washer fluid supply system S of a vehicle will be described. In FIG. 1, illustration of the heating device 1 is simplified. As illustrated in FIG. 1, the washer fluid supply system S includes the heating device 1, a washer fluid tank 2 which stores a washer fluid, a washer fluid pump 3 provided on an outlet side of the washer fluid tank 2, and a washer fluid nozzle 4 provided facing the front window glass of the vehicle.

The heating device 1 is provided between the washer fluid pump 3 and the washer fluid nozzle 4. An operation portion 5 is connected to the washer fluid pump 3 and the heating device 1. The operation portion 5 is a part operated by a driver of the vehicle or the like, and the washer fluid pump 3 is operated by operating the operation portion 5.

The heating device 1 and the washer fluid tank 2 are connected via a first pipe line 6. The washer fluid pump 3 is disposed in the first pipe line 6. The heating device 1 and the washer fluid nozzle 4 are connected via a second pipe line 7. The second pipe line 7 is provided with a check valve 8 which applies a pressure to the washer fluid stored in a storage space A inside the heating device 1. The check valve 8 has a housing 8a, a ball 8b which seals an end portion of the second pipe line 7, and a spring 8c which presses the ball 8b against the second pipe line 7 with a predetermined pressing force. The ball 8b and the spring 8c are accommodated in the housing 8a. In the supply system S, the washer fluid is ejected from the washer fluid nozzle 4 as the discharge pressure of the washer fluid pump 3 exceeds the pressing force of the check valve 8.

Figure 2:
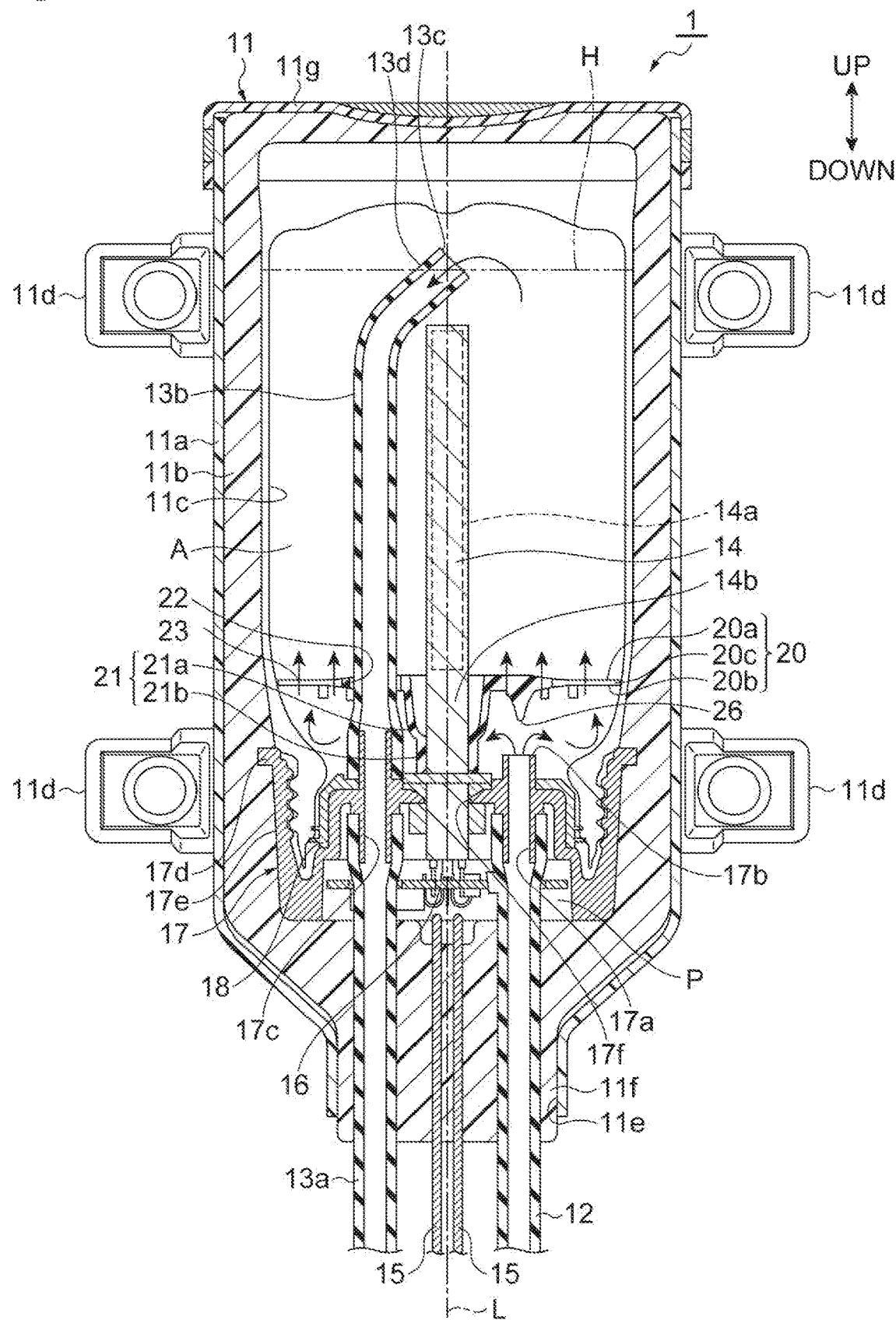
FIG. 2 is a longitudinal sectional view illustrating the washer fluid heating device according to the first embodiment.

As illustrated in FIG. 2, the heating device 1 has, as its outer configuration, a container 11 having a cylindrical shape with a bottom in which a bottom portion 11g is disposed to face upward. The container 11 includes a cover 11a having a cylindrical shape with a bottom, a foam case 11b disposed inside the cover 11a, and an inner container 11c disposed inside the foam case 11b.

The cover 11a is formed of, for example, polypropylene (PP). Four brackets 11d which fix the heating device 1 to the inside of the vehicle are fixed to the outer side of the cover 11a. The bracket 11d may be made of PP. The inner container 11c has a double structure via a vacuum layer, similarly to a thermos bottle. By the heat insulation effect of the double structure, the temperature of the washer fluid stored in the storage space A inside the inner container 11c is kept.

The foam case 11b has a lid 11f that closes an opening 11e of the container 11. An inflow tube 12, a first outflow tube 13a, a second outflow tube 13b, and a wire 15 vertically pass through the lid 11f. The washer fluid flows from the inflow tube 12 into the storage space A and flows out of the storage space A via the second outflow tube 13b and the first outflow tube 13a. A bar-shaped heater 14 disposed in the container 11 is electrically connected to the wire 15. For example, the wire 15 is passed along a center axis L of the container 11.

In the storage space A, a control circuit 16, a cap 17, a packing 18, and a deflector 20 (partition member) are provided. The control circuit 16 is provided between the upper end of the wire 15 and the heater 14. The upper end of the inflow tube 12 and the upper end of the first outflow tube 13a are attached to the cap 17. The packing 18 is provided on the upper side of the cap 17, and the deflector 20 vertically partitions the storage space A into an upper space and a lower space. The deflector 20 functions as a flow guide plate for the washer fluid.

The inflow tube 12 is connected to the first pipe line 6, and the washer fluid flows into the container 11 from the inflow tube 12. The inflow tube 12, the first outflow tube 13a, and the second outflow tube 13b are made of; for example, ethylene propylene diene monomer (EPDM). The inner diameters of all the inflow tube 12, the first outflow tube 13a, and the second outflow tube 13b are, for example, 5.0 mm.

The cap 17 is provided with a first cylindrical portion 17a to which the upper end of the inflow tube 12 is connected, and the upper end of the first cylindrical portion 17a serves as an inflow portion 17b through which the washer fluid flows into the storage space A. The inner diameter of the inflow portion 17b is, for example, 5.0 mm. The inflow portion 17b is provided below the deflector 20;

The cap 17 is formed in a stepped annular shape having steps in a radial direction. The cap 17 includes the first cylindrical portion 17a and the inflow portion 17b described above, a second cylindrical portion 17c, an outer edge portion 17d, an outer circumferential portion 17e, and an insertion portion 17f. The outflow tubes 13a and 13b are connected to the second cylindrical portion 17c. The outer edge portion 17d is vertically engaged with the foam case 11b. The outer circumferential portion 17e extends downward from the outer edge portion 17d along the foam case 11b, and the heater 14 is inserted through the insertion portion 17f. The packing 18 is disposed to cover the upper sides of the first cylindrical portion 17a of the cap 17, the second cylindrical portion 17c, and the insertion portion 17f. The packing 18 is provided to secure liquid tightness of the first cylindrical portion 17a, the second cylindrical portion 17c, and the insertion portion 17f.

The first outflow tube 13a is connected to the second pipe line 7, and the washer fluid flows out of the container 11 from the first outflow tube 13a. The upper end of the first outflow tube 13a is connected to the second cylindrical portion 17c of the cap 17, and the second outflow tube 13b is connected to the upper side of the second cylindrical portion 17c. The second outflow tube 13b passes through the deflector 20 from the second cylindrical portion 17c and extends upward beyond the deflector 20.

The upper end of the second outflow tube 13b serves as an outflow portion 13c into which the washer fluid flow from the storage space A. An upper side portion 13d of the second outflow tube 13b having the outflow portion 13c at the upper end is bent obliquely toward the center axis L. For example, the outflow portion 13c is provided immediately above the heater 14, that is, on the center axis L. By disposing the outflow portion 13c immediately above the heater 14 as described above, it is possible to cause the heated washer fluid to reliably flow out. In addition, the washer fluid is stored up to a water level H by the outflow portion 13c. The outflow portion 13c is positioned at a point at which the volume of the washer fluid inside the storage space A becomes 90% or less of the capacity of the storage space A.

The heater 14 extends upward from the control circuit 16, and for example, is disposed along the center axis L of the container 11. As described above, by disposing the heater 14 along the center axis L, it is possible to reduce the unevenness of the temperature distribution of the washer fluid. Similar to the second outflow tube 13b, the heater 14 passes through the deflector 20 and extends upward beyond the deflector 20.

The heater 14 heats the washer fluid positioned above the deflector 20. That is, a heating portion 14a of the heater 14 is disposed only above the deflector 20. Specifically, a portion provided with a heating wire of the heater 14 serves as the heating portion 14a, and a portion which is positioned under the heating portion 14a and is not provided with a heating wire serves as a non-heating portion 14b. In addition, a plurality of clamps that connect the second outflow tube 13b to the heater 14 are attached to the heater 14, and the position of the second outflow tube 13b is stabilized by the clamps. The clamp is made of for example, SUS.

The lower portion of the cap 17, the lower end of the heater 14, the upper end of the inflow tube 12, and the upper end of the first outflow tube 13a are bonded and fixed to the upper portion of a lid 11f, for example, by a potting portion P using a two-pack adhesive. In a case where the heating device 1 is viewed from below, the inflow tube 12 and the first outflow tube 13a are disposed at symmetrical positions with respect to the center axis L. By disposing the inflow tube 12 and the first outflow tube 13a at the positions symmetrical to each other, it is possible to easily manufacture the container 11 in a case where the container 11 is manufactured by abutting half-split members.

The deflector 20 is disposed to be in contact with the inner wall surface of the inner container 11c. The deflector 20 is formed in a disk shape. The deflector 20 has an upper surface 20a facing upward in the storage space A, a lower surface 20b on the opposite side of the upper surface 20a, and a circular outer edge 20c. The deflector 20 is formed of a material having flexibility. Here, in this specification, "a material having flexibility" is, for example, a material which can be bent by a hand, and a rubber material can be adopted. In the embodiment, the deflector 20 is made of EPDM.

The deflector 20 includes a tubular heater insertion portion 21 protruding downward. The heater insertion portion 21 has an inclined tube portion 21a which is decreased in diameter from the lower surface 20b, and a cylindrical portion 21b which extends downward from the smallest diameter portion of the inclined tube portion 21a along the center axis L. The inner diameter of the cylindrical portion 21b is slightly smaller than the outer diameter of the heater 14. Therefore, by press-fitting the heater 14 into the cylindrical portion 21b, it is possible to reliably hold the heater 14 with the deflector 20. In addition, the deflector 20 has a circular tube holding hole 22 which holds the second outflow tube 13b in a state of being inserted therethrough.

Figure 3A:
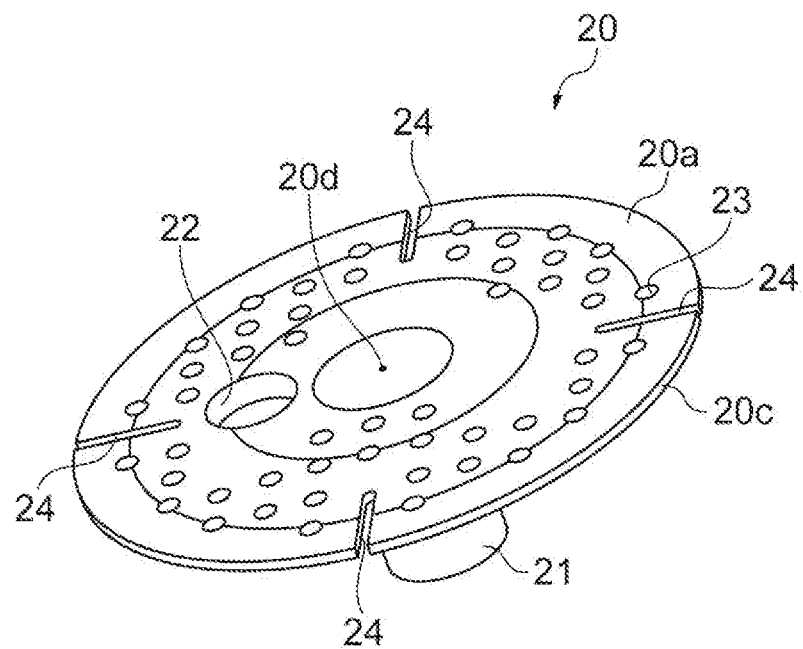
FIG. 3(a) is a perspective view of a partition member as viewed from above.
Figure 3B:
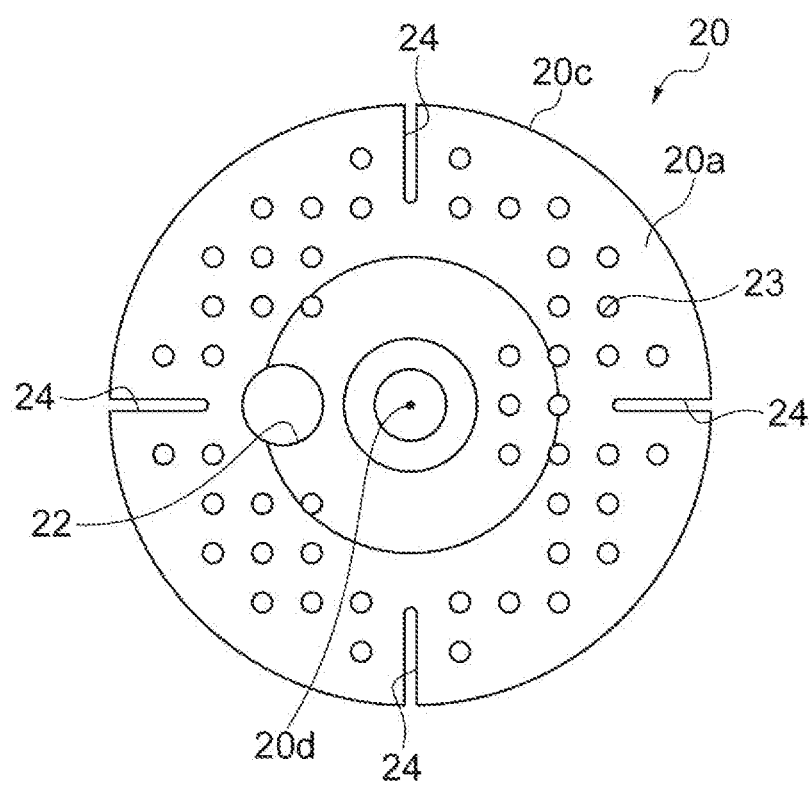
FIG. 3(b) is a plan view of the partition member.

FIG. 3(a) is a perspective view of the deflector 20 as viewed from the upper surface 20a side, and FIG. 3(b) is a plan view of the deflector 20. As illustrated in FIGS. 3(a) and 3(b), the deflector 20 has a plurality of holes 23, and each of the holes 23 vertically penetrates through the deflector 20. The hole 23 is provided to cause the washer fluid to pass therethrough in an upward direction. In the embodiment, the number of holes 23 is 50. The hole 23 is circular, for example, and the diameter of each of the holes 23 is 2.0 mm. In addition, as described above, the inner diameter of the inflow portion 17b into which the washer fluid flows is 5.0 mm. Therefore, the total cross-sectional area of the flow passages of the washer fluid in the 50 holes 23 is larger than the cross-sectional area of the flow passage of the washer fluid in the inflow portion 17b.

The plurality of holes 23 are disposed to be substantially evenly distributed in the deflector 20. Here, in this specification, "the plurality of holes are disposed to be substantially evenly distributed" indicates a state in which the holes are disposed evenly in the deflector 20 so that the washer fluid rises in a planar form from the holes. "The plurality of holes are disposed to be substantially evenly distributed" includes, for example, a state in which a plurality of holes are disposed so as to be symmetrical with respect to the center of the deflector, or a state in which a plurality of holes are disposed to be concentrically distributed. In the embodiment, the plurality of holes 23 are disposed to be distributed in a lattice form.

The deflector 20 has slits 24 extending linearly inward in the radial direction of the deflector 20 from the outer edge 20c. The deflector 20 has, for example, four slits 24, and the four slits 24 are formed radially with respect to a center 20d. The four slits 24 are disposed at equal intervals in the circumferential direction of the deflector 20. The length of each of the slits 24 is, for example, about ⅓ of the radius of the deflector 20.

Figure 4A:
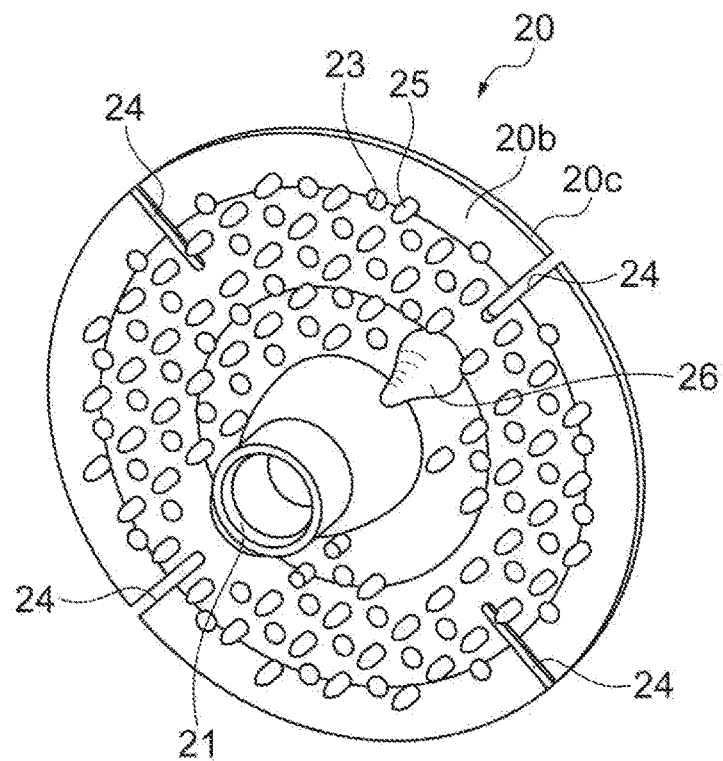
FIG. 4(a) is a perspective view of the partition member as viewed from below.
Figure 4B:
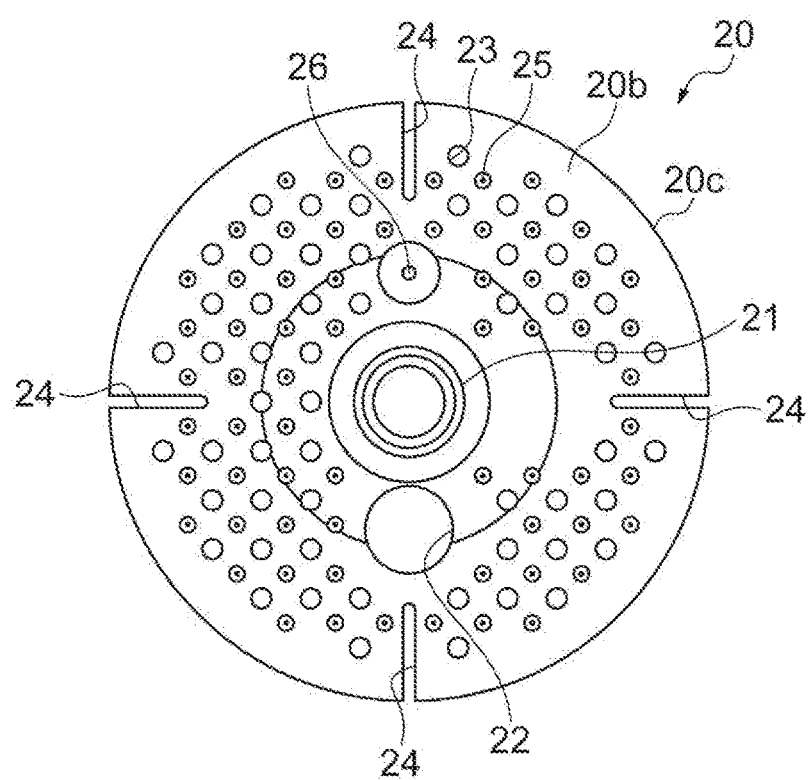
FIG. 4(b) is a bottom view of the partition member.

FIG. 4(a) is a perspective view of the deflector 20 as viewed from the lower surface 20b side, and FIG. 4(b) is a bottom view of the deflector 20. As illustrated in FIGS. 4(a) and 4(b), the deflector 20 includes a plurality of first protrusions 25 protruding from the lower surface 20b, and a single second protrusion 26 protruding from the lower surface 20b beyond the first protrusions 25.

Each of the first protrusions 25 has, for example, a circular shape with a diameter of 1.5 mm in a plan view and protrudes from the lower surface 20b in a U-shape. In the embodiment, the number of first protrusions 25 is 65. The plurality of first protrusions 25 are disposed to be substantially evenly distributed in the lower surface 20b. Here, "the first protrusions are disposed to be substantially evenly distributed" indicates a state in which first protrusions are disposed evenly in the lower surface of the deflector. "The first protrusions are disposed to be substantially evenly distributed" includes, for example, a state in which a plurality of first protrusions are disposed so as to be symmetrical with respect to the center of the deflector, or a state in which a plurality of first protrusions are disposed to be concentrically distributed. In the embodiment, the plurality of first protrusions 25 are disposed to be distributed in a lattice form. Each of the first protrusions 25 is disposed at an intermediate position between the two adjacent holes 23. In addition, the first protrusion 25 is disposed at the center of the four holes 23 which are disposed in a square form in the plan view and are adjacent to each other.

Figure 5:
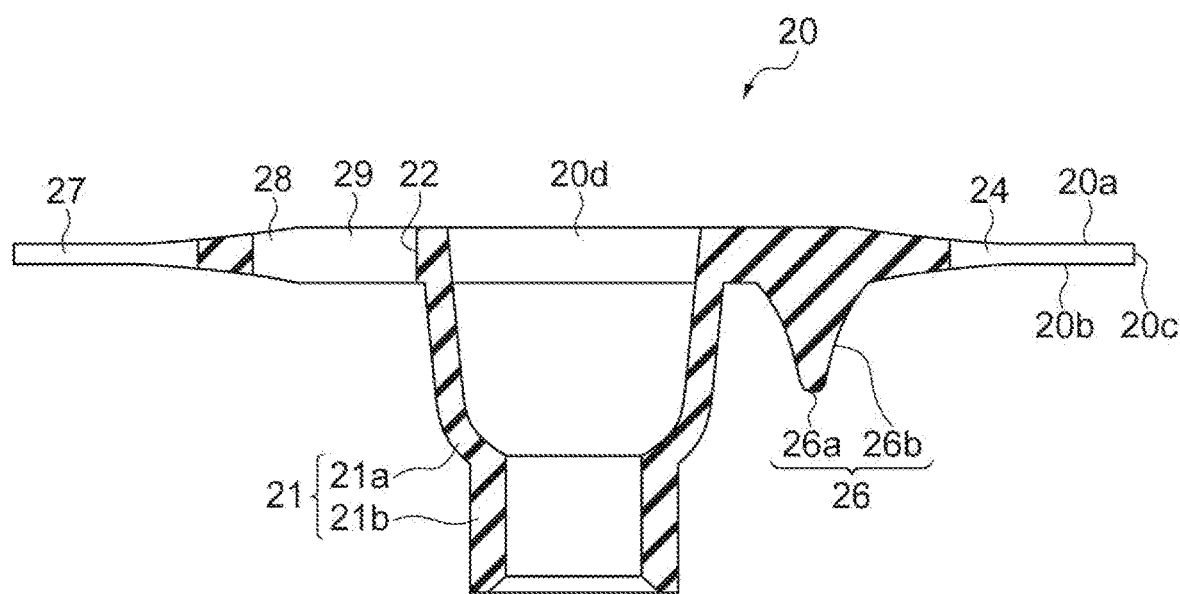
FIG. 5 is an enlarged sectional view of the partition member of FIG. 2.

The second protrusion 26 is disposed between the single slit 24 and the heater insertion portion 21. As illustrated in FIGS. 2 and 5, the second protrusion 26 includes a top portion 26a formed in a curved shape, and a curved surface portion 26b curved along the lower surface 20b from the top portion 26a. The second protrusion 26 is disposed at a position facing the inflow portion 17b of the washer fluid. Since the second protrusion 26 has the top portion 26a and the curved surface portion 26b as described above, it is possible to cause the washer fluid from the inflow portion 17b to be dispersed along the lower surface 20b. In addition, since the diameter of the second protrusion 26 and the inner diameter of the inflow portion 17b are substantially coincident with each other in the plan view, it is possible to efficiently disperse the washer fluid from the inflow portion 17b.

The thickness of the deflector 20 is thick in the vicinity of the center 20d and decreases from the center 20d toward the outer edge 20c. Specifically, the deflector 20 has an annular thin portion 27 positioned radially outward, an annular tapered portion 28 which gradually increases in thickness from the radially inner end portion of the thin portion 27 toward the center 20d, and an annular thick portion 29 positioned radially inward of the tapered portion 28. The slit 24 is disposed in the thin portion 27 and the tapered portion 28. In addition, the heater insertion portion 21 is formed in the thick portion 29, and the tube holding hole 22 is disposed at a position across the tapered portion 28 and the thick portion 29.

Next, the function and effect of the heating device 1 according to the embodiment will be described.

The heating device 1 includes the deflector 20 which vertically partitions the storage space A for the washer fluid inside the container 11, and the inflow portion 17b through which the washer fluid flows into the lower side of the storage space A partitioned by the deflector 20. Therefore, the washer fluid that has flowed into the storage space A hits the deflector 20 from below. An abrupt rise of the washer fluid can be suppressed by the deflector 20, so that the washer fluid can be caused to slowly rise.

In addition, in the deflector 20, the plurality of holes 23 through which the washer fluid passes from the lower side toward the upper side are disposed to be substantially evenly distributed. Therefore, the washer fluid rises from each of the plurality of holes 23 disposed to be substantially evenly distributed. Therefore, the washer fluid can be caused to smoothly rise, and the pressure loss of the washer fluid can be reduced. In addition, since the washer fluid slowly rises from the deflector 20 substantially evenly, it is possible to cause agitation to be less likely to occur above the deflector 20.

Furthermore, the heating portion 14a of the heater 14 that heats the washer fluid is provided above the deflector 20. Therefore, since the heating portion 14a heats the washer fluid that slowly rises from the deflector 20 substantially evenly, heating of the washer fluid can be sufficiently performed. Therefore, the washer fluid that has been sufficiently heated can be caused to flow out of the outflow portion 13c, so that a decrease in the temperature of the washer fluid flowing out of the container 11 can be suppressed.

In addition, since the part of the upper side and the part of the lower side of the storage space A are partitioned by the deflector 20, it is possible to cause heat of the heating portion 14a to be less likely to escape into the part of the lower side. Therefore, the decrease in the temperature of the washer fluid flowing out of the outflow portion 13c can be further reliably suppressed.

In addition, the total cross-sectional area of the flow passages of the washer fluid in the plurality of holes 23 is larger than the cross-sectional area of the flow passage of the washer fluid in the inflow portion 17b. Therefore, the washer fluid rises more smoothly from the plurality of holes 23, so that the pressure loss of the washer fluid can be more reliably reduced.

Furthermore, the deflector 20 has the plurality of first protrusions 25 protruding downward. Therefore, the plurality of first protrusions 25 protrudes downward from the deflector 20. Accordingly, the washer fluid that has flowed in flows into the plurality of first protrusions 25 from below, so that the washer fluid below the deflector 20 can be agitated. Therefore, an abrupt rise of the washer fluid from the deflector 20 can be more reliably suppressed, and the rise of the washer fluid from the deflector 20 can be made more uniform.

In addition, the deflector 20 has the second protrusion 26 protruding downward from the position facing the inflow portion 17b. Therefore, the washer fluid that has flowed into the container 11 flows into the second protrusion 26, so that the flow of the washer fluid can be dispersed by the second protrusion 26. Therefore, an abrupt rise of the washer fluid from the deflector 20 can be more reliably suppressed, and the washer fluid can be caused to uniformly and slowly rise from the deflector 20. Furthermore, since the washer fluid that has flowed in is dispersed, the inflow pressure of the washer fluid against the deflector 20 can be reduced. Therefore, vibration of the deflector 20 due to the inflow of the washer fluid can be more reliably suppressed.

In addition, the deflector 20 is formed of a material having flexibility. Therefore, the deflector 20 can be easily bent, so that it is possible to easily dispose the deflector 20 in the container 11 during manufacturing, maintenance, or the like of the heating device 1.

In addition, the deflector 20 has the slits 24 extending inward from the outer edge 20c of the deflector 20. Therefore, the deflector 20 can be more easily bent, and it is possible to more easily dispose the deflector 20 in the container 11.

Furthermore, the plurality of first protrusions 25 are disposed to be distributed in the lower surface 20b. Since the plurality of first protrusions 25 are disposed to be distributed as described above, agitation of the washer fluid below the deflector 20 can be further promoted. Therefore, the rising current of the washer fluid from the deflector 20 can be made more uniform, so that the decrease in the temperature of the washer fluid discharged from the container 11 can be suppressed more reliably. In addition, the first protrusion 25 is disposed at an intermediate position between the two hole portions 23, and furthermore, the first protrusion 25 is disposed at the center position of the four hole portions 23 which are disposed in a square form. Therefore, only the washer fluid that has been sufficiently agitated by the first protrusions 25 can be caused to pass through the holes 23.

Further, the deflector 20 is formed of EPDM. Accordingly, the deflector 20 is made flexible and the material of the deflector 20 can be made to withstand chemicals such as alcohols or surfactants.

Further, in the deflector 20, the plurality of slits 24 extend radially inward from the outer edge 20c. Therefore, the deflector 20 can be easily bent with the portions where the slits 24 are formed as the boundaries, so that the inserting property of the deflector 20 into the container 11 can be enhanced.

In addition, the deflector 20 includes the thin portion 27 provided on the radially outside and the thick portion 29 provided on the radially inside, and decrease in thickness toward the radially outside. Therefore, the outer portion of the deflector 20 can be easily bent, so that the inserting property of the deflector 20 into the container 11 can be further increased.

Second Embodiment

Figure 6:
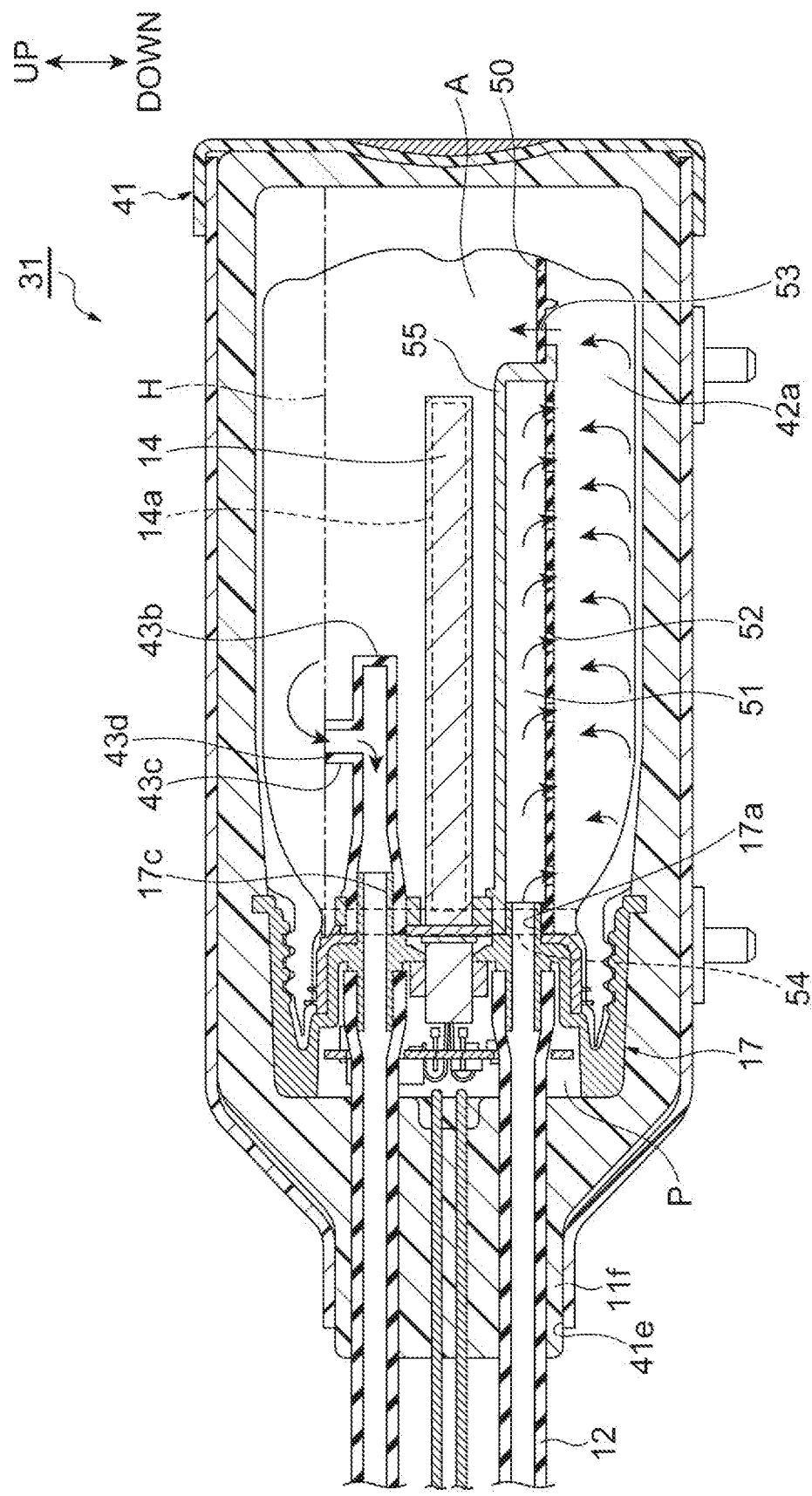
FIG. 6 is a longitudinal sectional view illustrating a washer fluid heating device according to a second embodiment.

Next, a washer fluid heating device 31 according to a second embodiment will be described with reference to FIG. 6. In the heating device 1 according to the first embodiment, the opening 11e of the container 11 faces downward. However, the heating device 31 is different from the first embodiment in that an opening 41e of a container 41 faces laterally. In addition, the structures of an inflow region 42a for the washer fluid, a deflector 50, and a second outflow tube 43b are different from those of the first embodiment. Hereinafter, the descriptions overlapping the first embodiment will be omitted.

In the second embodiment, the inflow region 42a is provided below the deflector 50. A fixing member 55 is attached to the deflector 50, and the deflector 50 is fixed to the storage space A by the fixing member 55. In addition, the deflector 50 has an inner region 51 that communicates with the first cylindrical portion 17a of the cap 17, a plurality of inflow portions 52 provided under the inner region 51, and holes 53 which are positioned outside the inflow portion 52 in the plan view. The holes 53 are portions corresponding to the holes 23 of the first embodiment. Therefore, like the holes 23, a plurality of holes 53 are disposed to be substantially evenly distributed.

In addition, the heater 14 is provided on the upper side of the storage space A partitioned by the deflector 50, and the heating portion 14a of the heater 14 is positioned on the upper side of the storage space A. In addition, like the second outflow tube 13b of the first embodiment, the second outflow tube 43b is connected to the second cylindrical portion 17c. The second outflow tube 43b includes a branch portion 43c protruding upward, and the upper end of the branch portion 43c serves as an outflow portion 43d for the washer fluid. As in the first embodiment, the outflow portion 43d is positioned at a point where the volume of the washer fluid inside the storage space A becomes 90% or less of the capacity of the storage space A.

The heating device 31 includes a heat insulation material 54 into which the first cylindrical portion 17a into which the washer fluid flows and the second cylindrical portion 17c from which the washer fluid flows are fitted. The heat insulation material 54 is, for example, a foam material such as expanded polystyrene. The heat insulation material 54 is disposed on the inner surface of the container 41 to surround the first cylindrical portion 17a and the second cylindrical portion 17c of the cap 17. By disposing the heat insulation material 54 in the vicinity of the inlet and outlet of the container 41 for the washer fluid, it is possible to suppress the escape of heat of the washer fluid from the vicinity of the inlet and outlet of the container 41.

As described above, the heating device 31 according to the second embodiment includes the deflector 50 that vertically partitions the storage space A for the washer fluid inside the container 41, and the inflow portions 52 through which the washer fluid flows into the lower side of the storage space A partitioned by the deflector 50. Therefore, the washer fluid that has flowed in hits the deflector 50 from below, so that an abrupt rise of the washer fluid can be suppressed by the deflector 50 and thus the washer fluid can be caused to slowly rise. In addition, in the deflector 50, the plurality of holes 53 through which the washer fluid passes from the lower side toward the upper side are disposed to be substantially evenly distributed. Therefore, the same effect as that of the heating device 1 of the first embodiment can be obtained.

While the embodiment of the present disclosure have been described above, the present disclosure is not limited to the above-described embodiments, and can be modified within the scope in which the gist described in each of the claims is not changed or applied to other things. That is, the present disclosure can be modified in various manners in the scope in which the gist described in each of the claims is not changed.

For example, in the above-described embodiment, an example in which the container 11 includes the cover 11a, the foam case 11b, and the inner container 11c has been described. However, the configuration of the container that stores the washer fluid is not limited to a configuration having the cover 11a and the foam case 11b, and can be appropriately changed. Further, the disposed form, number, and size of the inflow tube 12, the first outflow tube 13a, and the second outflow tube 13b can be appropriately changed.

Further, in the above-described embodiment, the bar-shaped heater 14 extending along the center axis L has been described. However, the shape, size, and disposed form of the heater can be appropriately changed. For example, the heating portion 14a of the heater 14 may be disposed under the deflector 20. Furthermore, the shapes, sizes, disposed positions, and the number of the wire 15, the control circuit 16, the cap 17, and the packing 18 are not limited to the above-described embodiment and can be appropriately changed.

In addition, in the above-described embodiment, the deflector 20 is described as a partition member that partitions the storage space A. However, the shape, size, material, and disposed form of the partition member are not limited to the embodiments described above. Furthermore, the shape, size, number, and disposed form of the holes, the slits, the first protrusions, and the second protrusions formed in the partition member are not limited to the above-described deflector 20 and can be appropriately changed.

In addition, in the above-described embodiment, an example in which the heating device 1 is disposed in the supply system S including the washer fluid tank 2, the washer fluid pump 3, the washer fluid nozzle 4, and the operation portion 5 has been described. However, the washer fluid heating device according to the present disclosure is not limited to the supply system S, and can be applied to various washer fluid supply systems.

INDUSTRIAL APPLICABILITY

According to the present disclosure, it is possible to suppress the pressure loss of a washer fluid and suppress a decrease in the temperature of the washer fluid flowing out of a container.

REFERENCE SIGNS LIST 1, 31: heating device, 2: washer fluid tank, 3: washer fluid pump, 4: washer fluid nozzle, 5: operation portion, 6: first pipe line, 7: second pipe line, 8: check valve, 8a: housing, 8b: ball, 80: spring, 11, 41: container, 11a: cover, 11b: foam case, 11c: inner container, 11d: bracket, 11e, 41e: opening, 11f: lid, 11g: bottom portion, 12: inflow tube, 13a: first outflow tube, 13b, 43b: second outflow tube, 13c, 43d: outflow portion, 13d: upper side portion, 14: heater, 14a: heating portion, 14b: non-heating portion, 15: wire, 16: control circuit, 17: cap, 17a: first cylindrical portion, 17b, 52: inflow portion, 17c: second cylindrical portion, 17d: outer edge portion, 17e: outer circumferential portion, 17f: insertion portion, 18: packing, 20, 50: deflector (partition member), 20a: upper surface, 20b: lower surface, 20c: outer edge, 20d: center, 21: heater insertion portion, 21a: inclined tube portion, 21b: cylindrical portion, 22: tube holding hole, 23, 53: hole, 24: slit, 25: first protrusion, 26: second protrusion, 27: thin portion, 28: tapered portion, 29: thick portion, 42a: inflow region, 43c: branch portion, 51: inner region, 54: heat insulation material, 55: fixing member, A: storage space, L: center axis, P: potting portion, S: supply system.

The invention claimed is:

1. A washer fluid heating device comprising:
a container to store a washer fluid;
a partition member which vertically partitions a storage space for the washer fluid into an upper space and a lower space;
an inflow portion through which the washer fluid flows into the lower space;
an outflow portion which is provided to the upper space to cause the washer fluid to flow out of the container; and
a heating portion which is positioned in the storage space,
wherein, in the partition member, a plurality of holes which cause the washer fluid to pass from the lower space toward the upper space are disposed to be substantially evenly distributed at a surface of the partition member, and
wherein the partition member comprises a plurality of washer fluid agitating protrusions which are U-shaped protrusions protruding from the surface of the partition member into the lower space to agitate the washer fluid contained in the lower space before the washer fluid passes through the plurality of holes into the upper space.

2. A washer fluid heating device comprising:
a container to store a washer fluid;
a partition member which vertically partitions a storage space for the washer fluid into an upper space and a lower space;
an inflow portion through which the washer fluid flows into the lower space;
an outflow portion which is provided to the upper space to cause the washer fluid to flow out of the container; and
a heating portion which is positioned in the storage space,
wherein, in the partition member, a plurality of holes which cause the washer fluid to pass from the lower space toward the upper space are disposed to be substantially evenly distributed at a surface of the partition member, and
wherein the partition member comprises a water fluid dispersing protrusion which is a protrusion comprising a top portion formed in a curved shape and protrudes from the surface of the partition member into the lower space at a position facing the inflow portion to disperse the washer fluid from the inflow portion before the washer fluid passes through the plurality of holes into the upper space.

3. The washer fluid heating device according to claim 1, wherein the partition member is formed of a material having flexibility.

4. The washer fluid heating device according to claim 1, wherein the partition member comprises a slit extending inward from an outer edge of the partition member.

5. The washer fluid heating device according to claim 1, wherein each of the washer fluid agitating protrusions comprises an end portion in a curved shape without any openings into the lower space.

6. The washer fluid heating device according to claim 1, wherein the plurality of washer fluid agitating protrusions are disposed so as to be symmetrical with respect to a center of the partition member.

7. The washer fluid heating device according to claim 1, wherein the plurality of washer fluid agitating protrusions are disposed so as to be concentrically distributed.

8. The washer fluid heating device according to claim 1, wherein the plurality of washer fluid agitating protrusions are disposed so as to be distributed in a lattice form.

9. The washer fluid heating device according to claim 1, wherein at least one of the plurality of washer fluid agitating protrusions is disposed at an intermediate position between two adjacent holes.

10. The washer fluid heating device according to claim 1, wherein at least one of the plurality of washer fluid agitating protrusions is disposed at a center of four adjacent holes which are disposed in a square form in a plan view.

11. The washer fluid heating device according to claim 2,
wherein the washer fluid dispersing protrusion comprises the top portion and a curved surface portion without any openings into the lower space, and
wherein the curved surface portion is curved along the surface from the top portion.

12. The washer fluid heating device according to claim 2,
wherein a diameter of the washer fluid dispersing protrusion and an inner diameter of the inflow portion are substantially coincident with each other in a plan view.

13. The washer fluid heating device according to claim 2,
wherein the partition member comprises a heater insertion portion to insert through the heating portion, and a plurality of slits extending inward from an outer edge of the partition member, and
wherein the washer fluid dispersing protrusion is disposed between the heater insertion portion and one of the plurality of slits.

14. The washer fluid heating device according to claim 13,
wherein the plurality of slits are formed radially with respect to a center of the partition member.

15. The washer fluid heating device according to claim 13,
wherein the plurality of slits are disposed at substantially equal intervals in the circumferential direction of the partition member.

16. The washer fluid heating device according to claim 13,
wherein a length of each of the plurality of slits is approximately ⅓ of a radius of the partition member.

17. The washer fluid heating device according to claim 13,
wherein the partition member comprises:
an annular thin portion positioned radially outward;
an annular tapered portion which gradually increases in thickness from an inner end portion of the thin portion toward a center of the partition member; and
an annular thick portion positioned radially inward of the tapered portion, and
wherein at least one of the plurality of slits is disposed in the thin portion and the tapered portion.

18. The washer fluid heating device according to claim 17,
wherein the heater insertion portion is formed in the thick portion.

19. A washer fluid heating device comprising:
a container to store a washer fluid;
a partition member which vertically partitions a storage space for the washer fluid into an upper space and a lower space;
an inflow portion through which the washer fluid flows into the lower space;
an outflow portion which is provided to the upper space to cause the washer fluid to flow out of the container; and
a heating portion which is positioned in the storage space,
wherein, in the partition member, a plurality of holes which cause the washer fluid to pass from the lower space toward the upper space are disposed to be substantially evenly distributed at a surface of the partition member,
wherein the partition member comprises a plurality of washer fluid agitating protrusions which are U-shaped protrusions protruding from the surface of the partition member into the lower space to agitate the washer fluid contained in the lower space before the washer fluid passes through the plurality of holes into the upper space, and
wherein the partition member comprises a water fluid dispersing protrusion which is a protrusion comprising a top portion formed in a curved shape and protrudes from the surface of the partition member into the lower space at a position facing the inflow portion to disperse the washer fluid from the inflow portion before the washer fluid passes through the plurality of holes into the upper space.

20. The washer fluid heating device according to claim 19,
wherein the water fluid dispersing protrusion protrudes beyond the washer fluid agitating protrusions.

\* \* \* \* \*